(12) United States Patent
Watanabe et al.

(10) Patent No.: US 11,945,336 B2
(45) Date of Patent: Apr. 2, 2024

(54) INFORMATION CREATION APPARATUS, INFORMATION CREATION PROGRAM, AND POWER SUPPLY CONTROL SYSTEM

(71) Applicant: TOYOTA JIDOSHA KABUSHIKI KAISHA, Toyota (JP)

(72) Inventors: Yoshimasa Watanabe, Sunto-gun (JP); Kizuku Yamada, Susono (JP); Masaki Ito, Toyota (JP); Sakiko Yoshida, Mishima (JP); Yuki Takahashi, Susono (JP); Tomonori Imamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 386 days.

(21) Appl. No.: 17/376,049

(22) Filed: Jul. 14, 2021

(65) Prior Publication Data

US 2022/0153165 A1  May 19, 2022

(30) Foreign Application Priority Data

Nov. 17, 2020  (JP) ................................. 2020-190861

(51) Int. Cl.
*B60L 58/13*  (2019.01)
*B60L 53/65*  (2019.01)

(52) U.S. Cl.
CPC ............... *B60L 58/13* (2019.02); *B60L 53/65* (2019.02)

(58) Field of Classification Search
CPC .................................. B60L 58/13; B60L 53/65
See application file for complete search history.

(56) References Cited

U.S. PATENT DOCUMENTS

| | | | |
|---|---|---|---|
| 2021/0291670 A1* | 9/2021 | Kaufman | B60L 58/12 |
| 2021/0300202 A1* | 9/2021 | Ogawa | G07F 15/008 |
| 2022/0001852 A1* | 1/2022 | Kageura | B60W 50/0097 |
| 2022/0200285 A1* | 6/2022 | Hamada | H02J 3/144 |

FOREIGN PATENT DOCUMENTS

JP        2010-110173 A       5/2010

* cited by examiner

*Primary Examiner* — Richard V Muralidar
(74) *Attorney, Agent, or Firm* — Oliff PLC

(57) ABSTRACT

An information creation apparatus includes a processor configured to, in a case where priorities of power supply are set to power supply targets, set upper limits of power storage remaining amounts of the power supply targets such that the upper limit of the power storage remaining amount of a power supply target with a lower priority is set to a value larger than a reference value.

20 Claims, 4 Drawing Sheets

INFORMATION CREATION APPARATUS, INFORMATION CREATION PROGRAM, AND POWER SUPPLY CONTROL SYSTEM

CROSS-REFERENCE TO RELATED APPLICATION

This application claims priority to Japanese Patent Application No. 2020-190861 filed on Nov. 17, 2020, incorporated herein by reference in its entirety.

BACKGROUND

1. Technical Field

This disclosure relates to an information creation apparatus, an information creation program, and a power supply control system.

2. Description of Related Art

In Japanese Unexamined Patent Application Publication No. 2010-110173 (JP 2010-110173 A), when electric power is supplied from an external power source, priorities of power supply are given to respective types of vehicles in accordance with levels of their public natures, so that power supply is performed on the vehicles in accordance with their priorities.

SUMMARY

However, in the power supply mode described in JP 2010-110173 A, a vehicle with a low priority does not have many opportunities of power supply. As a result, there is such a risk that the vehicle with a low priority cannot travel due to power shortage.

This disclosure is accomplished in view of the above problems, and an object of this disclosure is to provide an information creation apparatus, an information creation program, and a power supply control system each of which allows a vehicle with a low priority to be kept in a movable state for a long time in a case where priorities of power supply are given to respective types of vehicles.

An information creation apparatus according to this disclosure includes a processor configured to, in a case where priorities of power supply are set to electric vehicles each including a power storage device, create setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority.

Further, an information creation program according to this disclosure is an information creation program for causing a processor to, in a case where priorities of power supply are set to electric vehicles each including a power storage device, create setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority.

Further, a power supply control system according to this disclosure is a power supply control system including electric vehicles and an information creation apparatus. The electric vehicles each include a power storage device. The information creation apparatus includes a processor configured to, in a case where priorities of power supply are set to the electric vehicles, create setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority.

With this disclosure, in a case where priorities of power supply are given to respective types of vehicles, even a vehicle with a low priority can be maintained in a movable state for a long time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of this disclosure will be described below with reference to the drawings. The same or equivalent portions in all drawings of the following embodiment have the same reference sign. Further, this disclosure is not limited to the embodiment described below.

Embodiment

Figure 1:
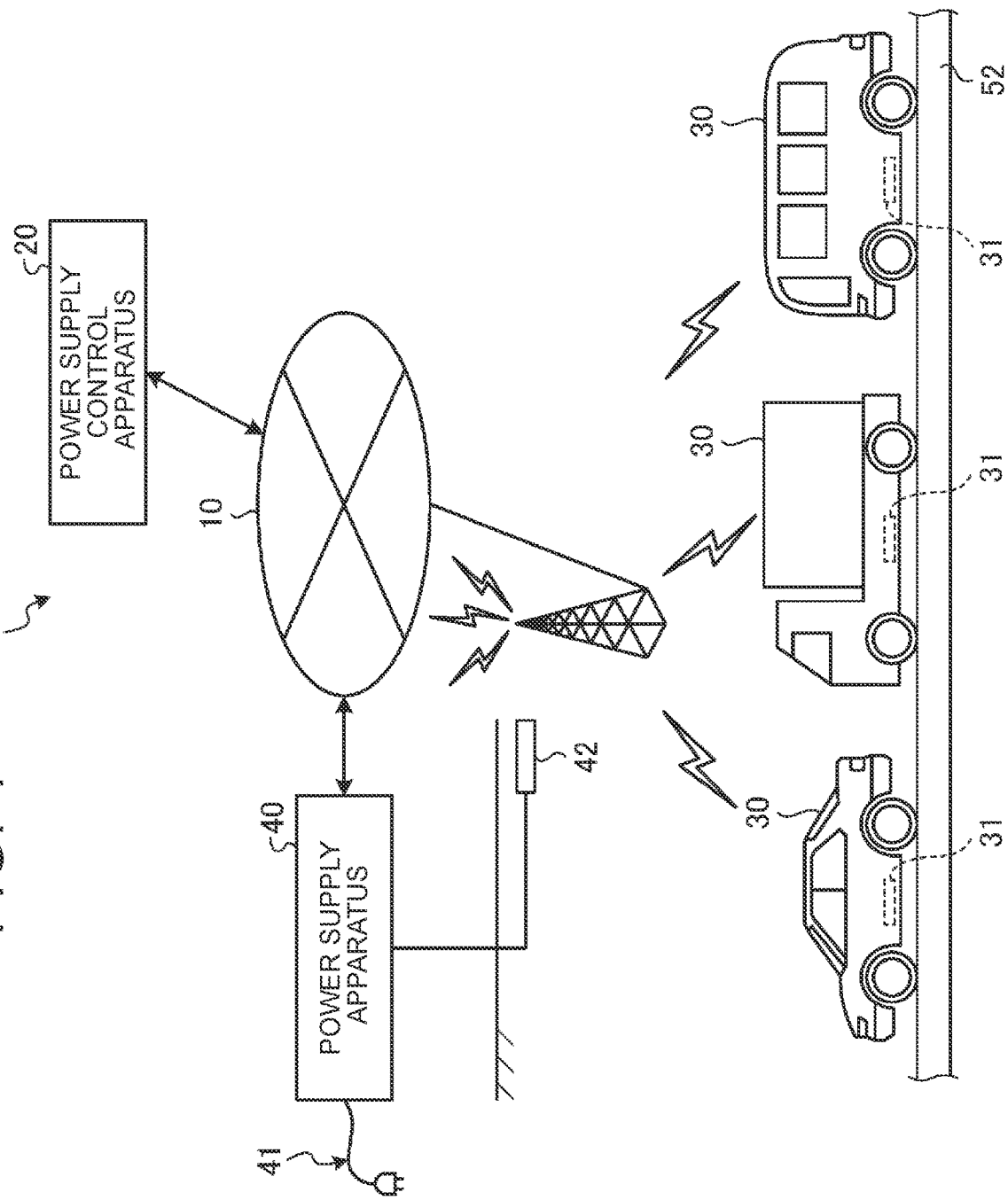
FIG. 1 is a schematic view illustrating a power supply control system according to one embodiment.
Figure 2:
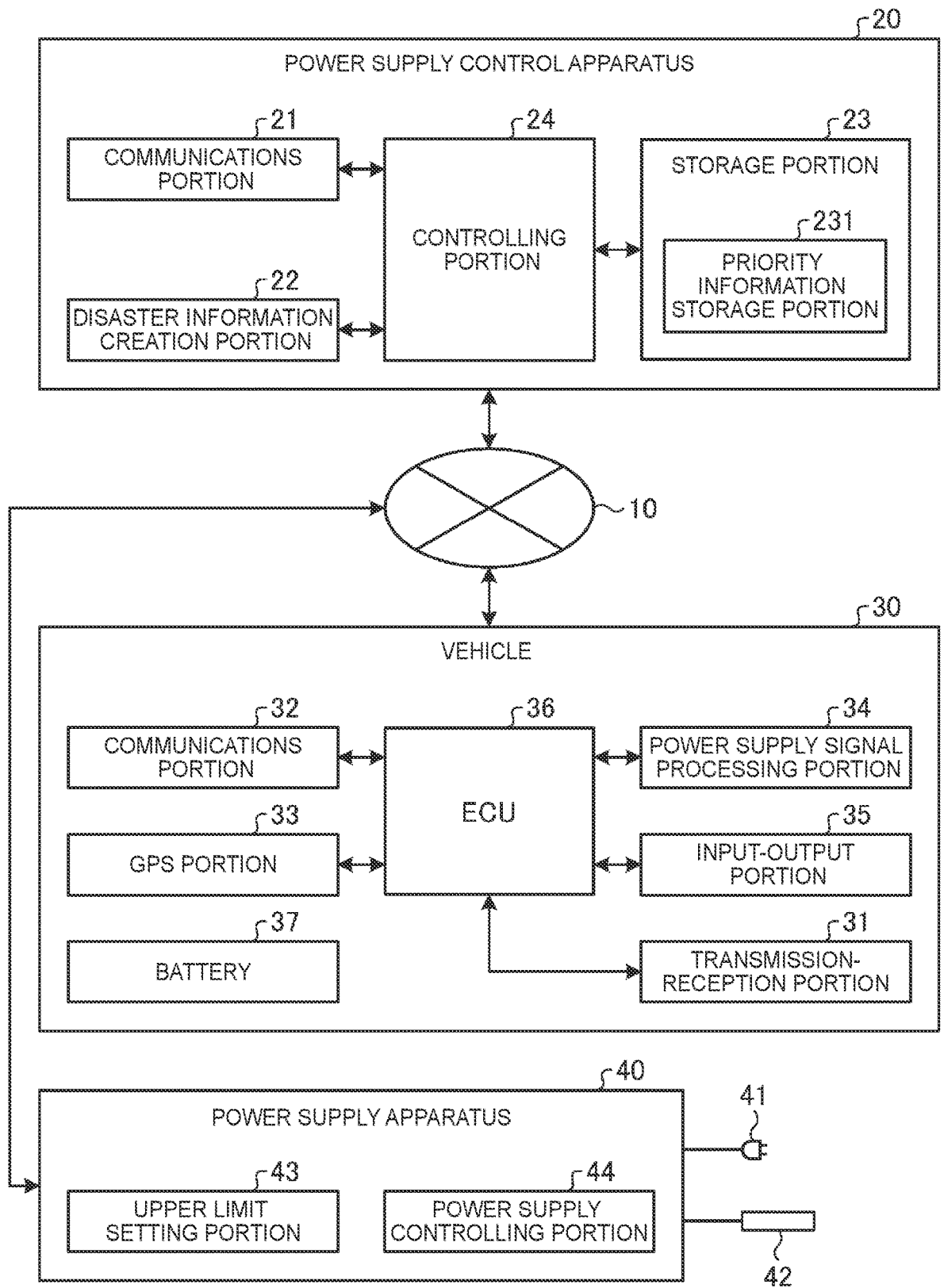
FIG. 2 is a block diagram to describe a configuration of the power supply control system according to one embodiment.

First described is a power supply control system according to one embodiment. FIG. 1 is a schematic view illustrating the power supply control system including a power supply apparatus according to one embodiment. FIG. 2 is a block diagram to describe a configuration of the power supply control system according to one embodiment.

The power supply control system 1 includes a power supply control apparatus 20, vehicles 30, and a power supply apparatus 40. In the power supply control system 1 according to the embodiment, the power supply control apparatus 20, the vehicles 30, and the power supply apparatus 40 are communicably connected to each other via a network 10. The network 10 is constituted by an Internet network, a mobile phone network, or the like via which the power supply control apparatus 20, the vehicles 30, and the power supply apparatus 40 are communicable with each other. In the present embodiment, the vehicles 30 are assumed as electric vehicles that are drivable in a hybrid driving mode or an EV driving mode. In each of the vehicles 30, a battery 37 is charged by electric power supplied from a wired power supply portion 41 or a wireless power supply portion 42 managed by the power supply apparatus 40.

The power supply control apparatus 20 sends acquired information on a disaster to the vehicles 30 traveling in a relevant area.

The power supply control apparatus 20 includes a communications portion 21, a disaster information creation portion 22, a storage portion 23, and a controlling portion 24. The power supply control apparatus 20 is constituted by one or more computers or the like including a central processing unit (CPU), a field programmable gate array (FPGA), a read only memory (ROM), a random access memory (RAM), and so on.

The communications portion 21 accesses the network 10 to communicate with the vehicles 30 and the power supply apparatus 40. The communications portion 21 is constituted by a reception portion configured to receive information on the vehicle 30 from the power supply apparatus 40, and a transmission portion configured to transmit various pieces of information including a power supply signal to the vehicle 30 as a target for transmission. Further, the communications portion 21 receives information on a disaster that is distributed from a disaster control center or the like of a country or a local government, for example.

The disaster information creation portion 22 creates disaster information based on the information on the disaster that is acquired from the outside.

The storage portion 23 is constituted by use of a recording medium readable by a computer, and various programs and various pieces of data are stored in the storage portion 23 in a writable and readable manner. The recording medium is constituted by a storage medium such as an optical disk, a flash memory, or a magnetic disk, and a drive device for such a storage medium.

Further, the storage portion 23 includes a priority information storage portion 231. A disaster and priorities are stored in the priority information storage portion 231 in association with each other. The priorities are given to respective types of the vehicles 30. The priority is set to be higher as the vehicle 30 has a higher public nature, for example. Further, different priorities may be set in accordance with types of disaster. As the priority of the vehicle 30 is higher, the vehicle 30 is preferentially subjected to power supply from the power supply apparatus 40. The priority is associated with the number of times of performable power supply per time, for example. As the priority is higher, the number of times of performable power supply per time is larger.

Here, as the priority, either of two priority levels "high" and "low" may be set to each vehicle 30 depending on whether the vehicle 30 is a public vehicle or not. Alternatively, multilevel priorities, e.g., five priority levels from 1 to 5 may be set to the vehicles 30 in accordance with their public levels such that a priority level of a higher value is set to the vehicle 30 as the public level of the vehicle 30 is higher.

The controlling portion 24 generally controls operation of each part in the power supply control apparatus 20.

Next will be described a configuration of the vehicle 30 with reference to FIGS. 1, 2. The vehicle 30 includes a transmission-reception portion 31, a communications portion 32, a global positioning system (GPS) portion 33, a power supply signal processing portion 34, an input-output portion 35, and an electronic control unit (ECU) 36. Further, the battery 37 configured to supply electric power to each part is provided in the vehicle 30. The battery 37 is configured to be chargeable. A component configured to control the vehicle 30 is constituted by use of one or more computers including a CPU, an FPGA, a ROM, a RAM, and so on.

The transmission-reception portion 31 functions as a reception portion configured to receive a power supply signal from the power supply apparatus 40 and also functions as a transmission portion configured to transmit own information to the power supply apparatus 40 via electromagnetic waves. Note that the reception portion and the transmission portion configured to transmit own information to the power supply apparatus 40 may not be provided integrally and may be provided separately.

The communications portion 32 communicates with the power supply control apparatus 20 by wireless communication via the network 10. The communications portion 32 receives driving support information for supporting driving of the vehicle 30 from the power supply control apparatus 20. Note that the driving support information includes road traffic information on regulations, traffic jams, and so on. Further, the communications portion 32 may be configured to transmit own information to the power supply apparatus 40 to which the communications portion 32 is connected.

The GPS portion 33 receives a radio wave from a GPS satellite and detects a position of the vehicle 30. The position thus detected is output to the outside or stored in a storage portion as positional information on the vehicle 30.

The power supply signal processing portion 34 converts a power supply signal received from the power supply apparatus 40 into electric power and supplies the electric power to the battery 37. The power supply signal is a power supply signal to be wirelessly received by the transmission-reception portion 31. Note that, in a case of wired connection, supplied electric power is input into the battery 37.

The input-output portion 35 is constituted by a touch panel display, a speaker, a microphone, and so on. The input-output portion 35 is configured such that predetermined information such as information on driving support can be input in or output from the input-output portion 35 in such a manner that characters, figures, or the like are displayed on a screen of the touch panel display or sound is output from the speaker in accordance with control by the ECU 36. Further, the input-output portion 35 is configured such that predetermined information can be input into the ECU 36 in such a manner that a user or the like of the vehicle 30 operates the touch panel display or utters voice to the microphone.

The ECU 36 is constituted by an information processor such as a microcomputer including a CPU, an FPGA, a ROM, a RAM, and so on. The ECU 36 generally controls electrical operation of each part in the vehicle 30. The ECU 36 is configured to perform computing by use of input data or data stored in advance and a program and to output a computing result as a control command signal. Further, the ECU 36 changes an upper limit of an SOC based on setting information from the power supply apparatus 40.

Note that the vehicle 30 includes the storage portion including a storage medium such as a hard disk or a semiconductor memory and a drive device for such a storage medium, a sensor configured to detect an object approaching an advance side of the vehicle 30, and so on. In the storage portion, an operating system (OS) necessary for the ECU 36 to generally control operation of each part in the vehicle 30 and programs for various applications are stored.

Further, the vehicle 30 includes a control mechanism and an operation mechanism for driving the vehicle 30. More specifically, the vehicle 30 includes a powertrain and a driving wheel as the drive mechanism. The powertrain includes a power source configured to generate driving force and output the driving force from an output shaft, and a power transmission mechanism configured to transmit, to the driving wheel, the driving force thus output from the power source.

Further, the operation mechanism is constituted by a shift lever, an accelerator pedal, and so on. Note that, in a case where the vehicle 30 performs self-driving, each part is driven in accordance with an instruction signal under the control of the ECU 36.

The power supply apparatus 40 includes the wired power supply portion 41, the wireless power supply portion 42, an upper limit setting portion 43, and a power supply controlling portion 44. The power supply apparatus 40 is constituted by use of one or more computers including a CPU, an FPGA, a ROM, a RAM, and so on. In the present embodiment, the power supply apparatus 40 has a function of an information creation apparatus.

The wired power supply portion 41 includes a connector to be connected to the vehicle 30. The wired power supply portion 41 transmits a power supply signal to the vehicle 30 in a state where the connector is connected to the vehicle 30.

The wireless power supply portion 42 transmits the power supply signal to the vehicle 30 by wirelessly communicating with the transmission-reception portion 31 of the vehicle 30. By the transmission of the power supply signal by the wireless power supply portion 42, noncontact charging is performed between the vehicle 30 and the power supply apparatus 40. When the transmission-reception portion 31 provided in the vehicle 30 communicates with the wireless power supply portion 42 provided in the power supply apparatus 40, the power supply signal is supplied to the vehicle 30. The transmission-reception portion 31 and the power supply apparatus 40 are each constituted by a coil, a switching circuit, and a rectification smoothing circuit, for example, and transmit and receive a power supply signal by a magnetic field resonance method. Hereby, the vehicle 30 and the power supply apparatus 40 communicate with each other in a noncontact state. Note that the present embodiment deals with an example in which power supply and transmission of information are performed by use of electromagnetic waves, but power supply and transmission of information may be performed by use of light.

In a case where a disaster occurs, the upper limit setting portion 43 creates setting information to change setting of an upper limit of charging in accordance with the type of the vehicle 30. In the present embodiment, the upper limit setting portion 43 increases the upper limit of the vehicle 30 having a low priority of charging at the time of a disaster. The upper limit setting portion 43 creates setting information to increase an upper limit of a power storage remaining amount of the vehicle 30 by the change of the upper limit. The power storage remaining amount is, for example, a state of charge (SOC). For example, in a case where the upper limit of the SOC in a normal state is set to 80%, the upper limit of the SOC is set to be larger than 80% for the vehicle 30 of a type the priority of which is set to be low. For example, in a case where the priority is set to either "high" or "low," the upper limit of the SOC is maintained at 80% for a vehicle the priority of which is "high," while the upper limit of the SOC is set to 85% for a vehicle the priority of which is "low." Further, in a case where the priority is set at multiple levels from 1 to 5, for example, the upper limit of the SOC is maintained at 80% for a vehicle the priority of which is "5," the upper limit of the SOC is set to 83% for a vehicle the priority of which is "4," the upper limit of the SOC is set to 85% for a vehicle the priority of which is "3," the upper limit of the SOC is set to 87% for a vehicle the priority of which is "2," and the upper limit of the SOC is set to 90% for a vehicle the priority of which is "1."

The power supply controlling portion 44 generally controls operation of each part in the power supply apparatus 40.

Further, in the present embodiment, the power supply apparatus 40 has a detection function to detect the vehicle 30 positioned on the power supply apparatus 40 and a reception function to receive information on the vehicle 30. The detection function and the reception function are constituted by use of a loop antenna, for example. For example, when the vehicle 30 is detected, the detection function transmits a detection signal to the power supply apparatus 40. Note that, when a vehicle can be detected by a coil or the like for power supply, the coil may be used for detection as well as for power supply.

Figure 3:
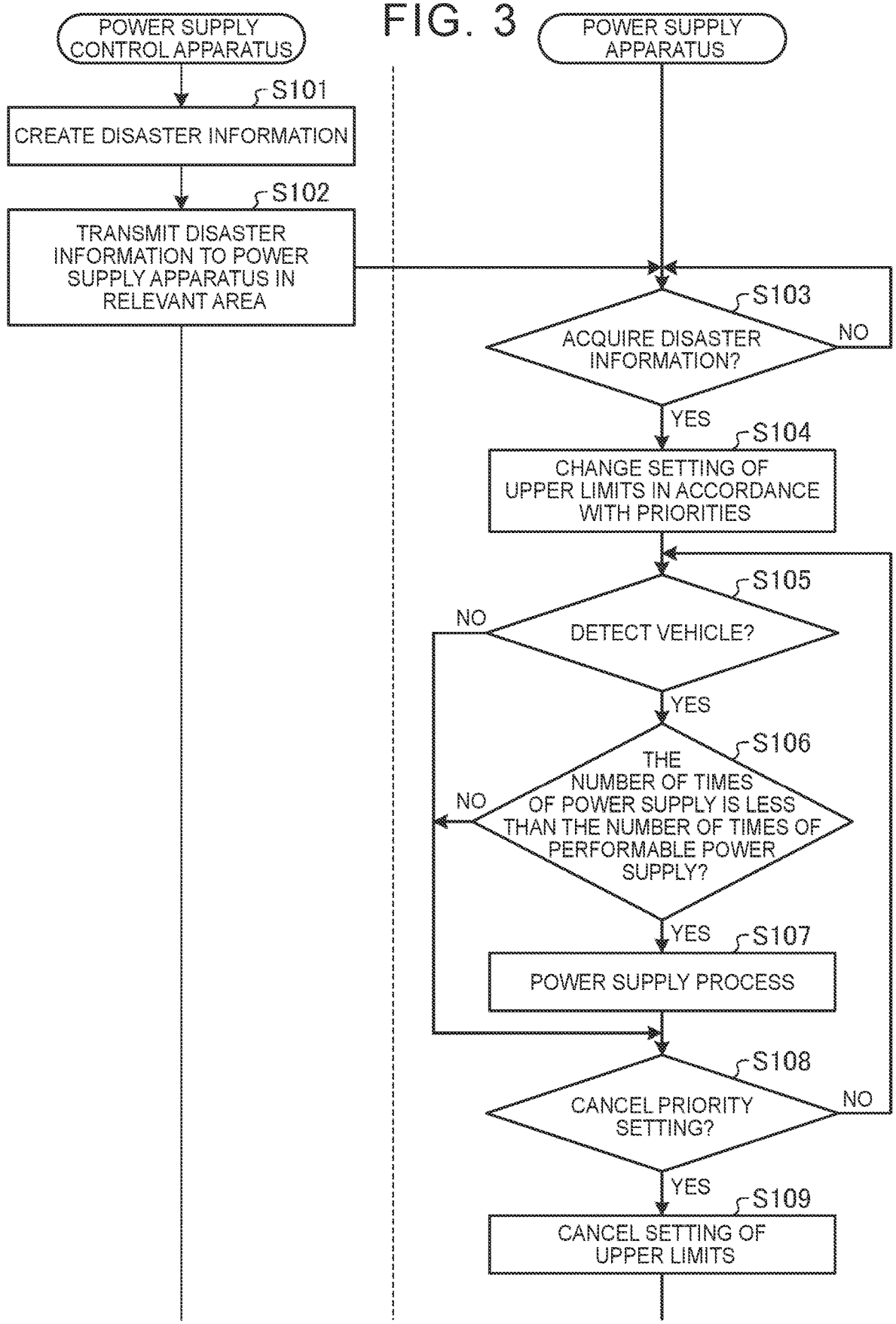
FIG. 3 is a sequence diagram to describe a power supply control process to be executed by the power supply control system according to one embodiment.

Next will be described a power supply control process to be executed by the power supply control system 1 with reference to FIG. 3. FIG. 3 is a sequence diagram to describe the power supply control process to be executed by the power supply control system according to one embodiment.

First, when the power supply control apparatus 20 acquires information on a disaster, the power supply control apparatus 20 creates disaster information (step S101). The disaster information created herein includes a type and a scale of the disaster, and priority setting information on priorities of power supply to the vehicles 30, the priorities being set in terms of the disaster.

The power supply control apparatus 20 distributes the disaster information to the vehicles 30 traveling in a relevant area and the power supply apparatus 40 set in the area (step S102).

Meanwhile, in the power supply apparatus 40, the power supply controlling portion 44 determines whether or not the power supply apparatus 40 receives the disaster information (step S103). When the power supply apparatus 40 does not receive the disaster information (step S103: No), the power supply controlling portion 44 repeats the determination on whether or not the power supply apparatus 40 receives the disaster information. On the other hand, when the power supply controlling portion 44 determines that the power supply apparatus 40 receives the disaster information (step S103: Yes), the power supply controlling portion 44 proceeds to step S104.

In step S104, the power supply apparatus 40 changes setting of the upper limits of power supply for respective types of the vehicles 30 in accordance with the priorities of the vehicles 30. More specifically, the upper limit setting portion 43 creates setting information to change the setting of the upper limits of charging in accordance with the types of the vehicles 30 and outputs the setting information to the vehicle 30 on which power supply is to be performed. Hereby, the upper limit of the power storage remaining amount in the vehicle 30 is changed in accordance with the type of the vehicle 30.

The power supply apparatus 40 performs detection of the vehicle 30 (step S105). The power supply controlling portion 44 detects placement of the vehicle 30 on the power supply apparatus 40 by determining whether or not the wired power supply portion 41 is connected to the vehicle 30 or determining whether or not the vehicle 30 is positioned on the wireless power supply portion 42. When the power supply controlling portion 44 determines that the vehicle 30 is not placed (step S105: No), the power supply controlling portion 44 proceeds to step S107. Further, when the power supply controlling portion 44 determines that the vehicle 30 is placed (step S105: Yes), the power supply controlling portion 44 proceeds to step S106.

In step S106, the power supply controlling portion 44 compares the number of times of performable power supply set to the connected vehicle 30 with the current number of times of power supply. When the power supply controlling portion 44 determines that the number of times of power supply is equal to or more than the number of times of performable power supply (step S106: Yes), the power supply controlling portion 44 proceeds to step S108, and the power supply controlling portion 44 does not perform a power supply process on the vehicle 30. On the other hand, when the power supply controlling portion 44 determines that the number of times of power supply is less than the number of times of performable power supply (step S106: No), the power supply controlling portion 44 proceeds to step S107.

In step S107, the power supply apparatus 40 supplies electric power to the vehicle 30. At this time, the power supply controlling portion 44 performs control such that electric power is supplied via a connecting portion (the wired power supply portion 41 or the wireless power supply portion 42) connected to the vehicle 30. The power supply controlling portion 44 acquires a power storage remaining amount from the vehicle 30 or reads a voltage value from the vehicle 30, for example, and supplies electric power to the vehicle 30 until the power storage remaining amount reaches its upper limit. At this time, the upper limit of power supply varies in accordance with the type of the vehicle 30, and the upper limit has been changed to a higher value as the priority of the vehicle 30 is lower.

After the power supply process, the power supply controlling portion 44 determines whether the setting of priority for power supply to the vehicle 30 is to be canceled or not (step S108). The power supply controlling portion 44 acquires follow-ups or the like of the disaster information, and when the power supply controlling portion 44 determines that the response to the disaster is not over and the setting of priority is not to be canceled (step S108: No), the power supply controlling portion 44 returns to step S105, so that the power supply controlling portion 44 repeats the processes in and after step S105. On the other hand, when the power supply controlling portion 44 determines that the response to the disaster is over and the setting of priority is to be canceled (step S108: Yes), the power supply controlling portion 44 proceeds to step S109.

In step S109, the power supply controlling portion 44 returns the upper limit setting of the power storage remaining amount in accordance with the priority to a normal state. For example, the power supply controlling portion 44 returns the upper limits of the SOC set in the vehicles 30 to their upper limits in the normal state.

After that, when the power supply control apparatus 20 acquires new information on a disaster, the power supply control apparatus 20 performs the disaster information creation process in step S101 again. The power supply apparatus 40 changes the upper limits and performs the power supply process in accordance with the new disaster information.

Note that it is preferable that the process of step S105 be executed regularly. A process interval is preferably short on cancelling the priority setting at a timing closer to real time. Further, when the power supply apparatus 40 does not receive disaster information, the power supply apparatus 40 performs power supply on the connected vehicle 30 to its upper limit in the normal state regardless of the type of the vehicle 30.

Figure 4:
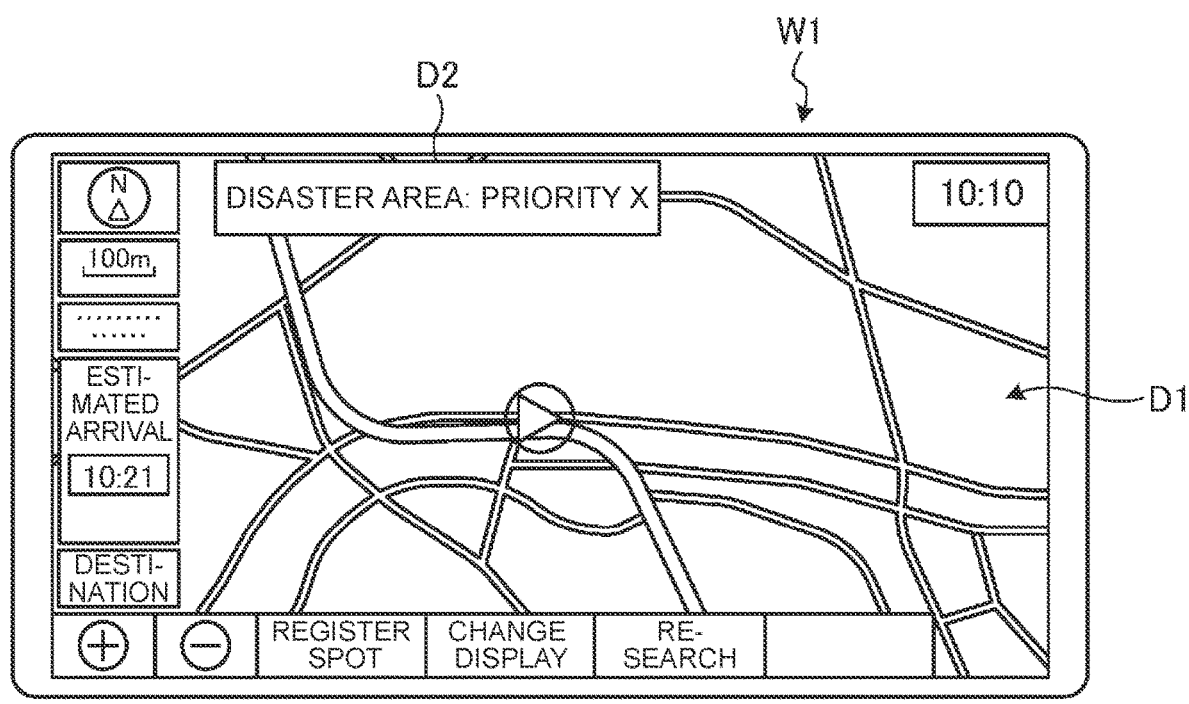
FIG. 4 is a view illustrating an example of an image displayed on a display provided in a vehicle according to one embodiment.

Here, in a case where the priority is set and the upper limit is changed due to disaster information, setting information on the priority may be distributed to the vehicle 30 traveling in a disaster area, so that the priority of power supply may be displayed in the vehicle 30. FIG. 4 is a view illustrating an example of an image displayed on a display provided in the vehicle according to one embodiment. In a display image W1 illustrated in FIG. 4, priority setting information D2 is displayed on a navigation image D1 including map information and so on in a superimposed manner. The priority setting information D2 includes information indicating that a current location where the own vehicle 30 is traveling is included in a disaster area, and the level of priority of the own vehicle 30. Due to the display, a driver or the like of the vehicle 30 traveling in the disaster area is notified that the vehicle 30 is traveling in the disaster area and is also notified of the priority of power supply. The driver identifies the priority and a current SOC, so that the driver can drive the vehicle 30 in consideration of a place and a timing for power supply.

In the present embodiment described above, at the time of a disaster, priorities of power supply are set to respective types of the vehicles 30, and the upper limit of the power storage remaining amount in a vehicle with a low priority is increased. In the present embodiment, power supply to a vehicle with a high priority is prioritized so that the vehicle is kept traveling, and the power storage remaining amount of the vehicle with a low priority at the time of full charge is increased. With the present embodiment, in a case where priorities of power supply are given to respective types of the vehicles, even a vehicle with a low priority can be maintained in a movable state for a long time.

Note that the embodiment deals with the power supply apparatus 40 including the wired power supply portion 41 and the wireless power supply portion 42 as an example, but the present disclosure is also applicable to a power supply apparatus including only either of the wired power supply portion 41 and the wireless power supply portion 42.

Further, the present embodiment deals with an example in which the power supply apparatus 40 controls power supply upon receipt of disaster information as a trigger. However, the present disclosure is not limited to the disaster information. For example, the power supply control in which priorities and upper limits are set can be also applied to a case where electric power to be supplied by the power supply apparatus 40 is unstable due to a system failure or the like of a base station that supplies electric power to the power supply apparatus 40.

Further, the present embodiment deals with an example in which information on priority is stored in the storage portion 23 of the power supply control apparatus 20, and disaster information to be distributed from the power supply control apparatus 20 includes the information on priority. However, the information on priority may be stored in the storage portion of each power supply apparatus 40, and the each power supply apparatus 40 may set priorities and change upper limits in accordance with the type of disaster. In this case, the power supply control apparatus 20 outputs, to the power supply apparatus 40, disaster information that does not include priorities. Further, the power supply control apparatus 20 may set upper limits in accordance with priorities and output setting information thus set to the vehicle 30. In this case, the power supply control apparatus 20 functions as an information creation apparatus (first and second apparatuses).

Recording Medium

In one embodiment, a program that can implement a processing method performed by a power supply control system can be recorded in a recording medium readable by a computer, other machines, or devices (hereinafter referred to as the computer or the like). By causing the computer or the like to read and execute the program in the recording medium, the computer or the like functions as a controlling portion of each apparatus in the power supply control system. Here, the recording medium readable by the computer or the like is a non-transitory recording medium in which information such as data or a program is stored electrically, magnetically, optically, mechanically, or chemically and from which the information can be read by the computer or the like. In such a recording medium, a recording medium that is removable from the computer or the like is, for example, a flexible disk, a magneto-optical disk, a CD-ROM, a CD-R/W, a digital versatile disk (DVD), a BD, a DAT, a magnetic tape, a memory card such as a flash memory, and the like. Further, a recording medium fixed to the computer or the like includes a hard disk, a ROM, and the like. Further, an SSD is also usable as the recording medium removable from the computer or the like or the recording medium fixed to the computer or the like.

Other Embodiments

Further, in the power supply control system according to one embodiment, a "portion" can be regarded as a "circuit" or the like. For example, the communications portion can be regarded as a communications circuit.

Further, the program to be executed by each apparatus in the power supply control system according to one embodiment may be stored in a computer connected to a network such as the Internet and provided by downloading via the network.

Further effects and modifications can be easily derived by a person skilled in the art. A wider variety of aspects of this disclosure are not limited to specific details and representative embodiments expressed and described above. Accordingly, various changes can be made without departing from the spirit or scope of a general concept of the disclosure defined by attached claims and their equivalents.

What is claimed is:

1. A power supply apparatus comprising:
    a processor configured to, in a case where priorities of power supply are set to electric vehicles each including a power storage device, create setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority; and
    a connecting portion connectable to the electric vehicles, the processor being configured to transmit power supply signal to the electric vehicles via the connecting portion based on the changed upper limit of the power storage remaining amount.

2. The power supply apparatus according to claim 1, wherein the priorities are priority levels set to respective types of the electric vehicles such that the electric vehicles are charged in order of the priority levels.

3. The power supply apparatus according to claim 2, wherein the processor determines whether power supply is performed on an electric vehicle or not based on the current number of times of power supply of the electric vehicle and the number of times of performable power supply corresponding to the priority level of the electric vehicle.

4. The power supply apparatus according to claim 1, wherein:
    the priorities include a plurality of priority levels; and
    the processor sets the upper limit to a larger value as the priority level is lower.

5. The power supply apparatus according to claim 4, wherein:
    the processor maintains setting of the upper limit of an electric vehicle with a highest priority level; and
    the processor increases the upper limit of an electric vehicle with a relatively low priority level.

6. The power supply apparatus according to claim 1, wherein:
    the priorities are set upon receipt of information on a disaster; and
    the processor sets the upper limits in accordance with the priorities.

7. A non-transitory computer-readable medium storing instructions executable by a processor to perform functions comprising:
    in a case where priorities of power supply are set to electric vehicles each including a power storage device, creating setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority;
    outputting the setting information to the electric vehicles; and
    transmitting a power supply signal to the electric vehicles based on the changed upper limit of the power storage remaining amount.

8. The non-transitory computer-readable medium according to claim 7, wherein the priorities are priority levels set to respective types of the electric vehicles such that the electric vehicles are charged in order of the priority levels.

9. The non-transitory computer-readable medium according to claim 8, wherein the functions further comprise determining whether power supply is performed on an electric vehicle or not based on the current number of times of power supply of the electric vehicle and the number of times of performable power supply corresponding to the priority level of the electric vehicle.

10. The non-transitory computer-readable medium according to claim 7, wherein:
    the priorities include a plurality of priority levels, and
    the functions further comprise setting the upper limit to a larger value as the priority level is lower.

11. The non-transitory computer-readable medium according to claim 10, wherein the functions further comprise:
    maintaining setting of the upper limit of an electric vehicle with a highest priority level; and
    increasing the upper limit of an electric vehicle with a relatively low priority level.

12. The non-transitory computer-readable medium according to claim 7, wherein:
    the priorities are set upon receipt of information on a disaster; and
    the functions further comprise setting the upper limits in accordance with the priorities.

13. A power supply control system comprising:

electric vehicles each including a power storage device; and a power supply apparatus including a processor and a connecting portion, the processor being configured to, in a case where priorities of power supply are set to the electric vehicles, create setting information based on which the electric vehicles change respective upper limits of power storage remaining amounts such that the upper limit of the power storage remaining amount of an electric vehicle of a type with a low priority is set to a value larger than a value of the upper limit of the power storage remaining amount of an electric vehicle of a type with a high priority, the connecting portion being connectable to the electric vehicles, and the processor being configured to transmit a power supply signal to the electric vehicles via the connecting portion based on the changed upper limit of the power storage remaining amount.

14. The power supply control system according to claim 13, wherein the priorities are priority levels set to respective types of the electric vehicles such that the electric vehicles are charged in order of the priority levels.

15. The power supply control system according to claim 14, wherein the processor determines whether power supply is performed on an electric vehicle or not based on the current number of times of power supply of the electric vehicle and the number of times of performable power supply corresponding to the priority level of the electric vehicle.

16. The power supply control system according to claim 13, wherein:
the priorities include a plurality of priority levels; and
the processor sets the upper limit to a larger value as the priority level is lower.

17. The power supply control system according to claim 16, wherein:
the processor maintains setting of the upper limit of an electric vehicle with a highest priority level; and
the processor increases the upper limit of an electric vehicle with a relatively low priority level.

18. The power supply control system according to claim 13, wherein:
the priorities are set upon receipt of information on a disaster; and
the processor sets the upper limits in accordance with the priorities.

19. The power supply control system according to claim 13, wherein the processor receives control information including priority setting information corresponding to a disaster that has occurred.

20. The power supply control system according to claim 19, wherein the processor sets the upper limits of the power storage remaining amounts in accordance with the priority setting information.

* * * * *